(12) United States Patent
Julien

(10) Patent No.: US 6,709,481 B2
(45) Date of Patent: Mar. 23, 2004

(54) METHOD FOR THE PRODUCTION OF A UNIQUE SOIL ADJUVANT FOR HORTICULTURAL AND AGRONOMIC USE

(75) Inventor: William E. Julien, Omaha, NE (US)

(73) Assignee: Biovance Technologies, Inc., Omaha, NE (US)

( * ) Notice: Subject to any disclaimer, the term of this patent is extended or adjusted under 35 U.S.C. 154(b) by 0 days.

(21) Appl. No.: 10/051,730

(22) Filed: Jan. 22, 2002

(65) Prior Publication Data

US 2002/0083748 A1 Jul. 4, 2002

Related U.S. Application Data

(60) Provisional application No. 60/258,599, filed on Dec. 29, 2000.

(51) Int. Cl.$^7$ .................................................. C05F 5/00
(52) U.S. Cl. ................................................ 71/25; 71/26
(58) Field of Search ........................................ 71/25, 26

(56) References Cited

U.S. PATENT DOCUMENTS 5,709,894 A * 1/1998 Julien ........................ 426/53
5,783,238 A * 7/1998 Julien ........................ 426/63
5,863,574 A * 1/1999 Julien ........................ 426/53
6,312,710 B1 * 11/2001 Julien ....................... 424/438
6,514,521 B1 * 2/2003 Julien ....................... 424/442

FOREIGN PATENT DOCUMENTS

| JP | 1012072 | | 1/1999 |
| WO | 98/49903 | * | 11/1998 |

* cited by examiner

*Primary Examiner*—Chhaya Sayala
(74) *Attorney, Agent, or Firm*—Paul M. Denk

(57) ABSTRACT

A soil adjuvant, comprising dried glutamic acid fermentation solubles, dried corn fermentation solubles, or a mixture of dried glutamic acid fermentation solubles and dried corn fermentation solubles, wherein said dried solubles have been dried to a total moisture content of less than 30% by weight at a temperature not less than about 80° F. and not more than about 900° F. The dried fermentation solubles can be mixed with a carrier, such as corn middlings, in a ratio of 1:10 to 10:1 by weight.

6 Claims, No Drawings

METHOD FOR THE PRODUCTION OF A UNIQUE SOIL ADJUVANT FOR HORTICULTURAL AND AGRONOMIC USE

CROSS-REFERENCE TO RELATED APPLICATIONS

This application claims priority to provisional application Ser. No. 60/258,599 filed Dec. 29, 2000, entitled "A Method For The Production Of A Unique Soil Adjuvant For Horticultural And Agronomic Use", and which is incorporated herein by reference.

STATEMENT REGARDING FEDERALLY SPONSORED RESEARCH OR DEVELOPMENT

Not Applicable.

BACKGROUND OF THE INVENTION

This invention relates principally to usage of glutamic acid fermentation solubles, and corn fermentation solubles, for application as a soil adjuvant.

Soil fertility, the ability of the soil to supply nutrients to plants, is a major factor in the production of forages, row crops, and horticultural ornaments. Plants need to be supplied either naturally or artificially with phosphorus (P), calcium (Ca), magnesium (Mg), potassium (K) and nitrogen (N). Applying nutrients to maintain and improve soil fertility becomes necessary as soils are depleted of nutrients by crop removal, leaching, and erosion and as attempts are made to push yields higher and higher.

Modern agricultural and horticultural practice requires artificial supplementation of soils with the nutrients plants need to grow. These nutrients are supplied in blends and marketed under the generic term fertilizer. Commonly, fertilizers are formulated using industrial byproducts. These byproducts often contain contaminants such as heavy metals, which are environmentally damaging. In addition, conventional blends of nitrogen, macro and micronutrients can themselves be environmentally problematic due to their highly soluble nature. Often times, these materials are applied during periods that do not allow for maximum plant uptake or degradation by soil microflora. This causes these materials to leach through the soil or actually run off and become major sources of environmental contamination, seriously polluting ground water, lakes, rivers, and streams. Although encapsulation technology of conventional fertilizers does reduce degradation rate, it does not eliminate entirely, the inherent environmental hazards of these materials. This is because these materials do not contain the full spectrum of nitrogen sources that are required by soil bacteria, molds, and fungi to maximize nitrogen degradation. Attempts to rectify this problem through the supplementation of other nitrogen sources such as animal or poultry waste have not proven successful due to the solubility of the nitrogen contained in these materials and their high content of macro minerals, particularly phosphorus. Government has recognized this problem as a major threat to potable water supplies as well as to fresh and saltwater fisheries and to the overall maintenance of a healthy global ecosystem. Legislation has already been passed to control the rates and times of soil fertilization, but environmental control through the law is expensive and inefficient. One solution is to develop a method for soil fertilization that takes full advantage of soil dynamics through the supplementation of nitrogen in a form that varies in its structural complexity and availability. This material would actually stimulate the growth of soil microflora, which in turn would maximize nutrient availability for plants under cultivation, thus eliminating the risk of run off associated with inefficient nutrient use.

SUMMARY OF THE INVENTION

This invention contemplates the use of a composition which is obtained from glutamic acid fermentation solubles, corn fermentation solubles, or a mixture thereof, and any other related source materials that provide the components of these types of fermentation solubles. The solubles are dried to a maximum moisture content of about 30%, at a low temperature. The solubles are preferably dried to a moisture content somewhere in the vicinity of 14%, more or less, for use as a soil adjuvant. The dried fermentation solubles are then blended with a source of organic and inorganic nitrogen, of variable solubles in the form of nonprotein nitrogen, peptides, amino acids, and intact protein, derived in the preferred embodiment of the invention from glutamic acid fermentation solubles and/or corn fermentation solubles to which a carrier and additional amino acids may be added.

The application of this material to soil will stimulate the growth of both aerobic and anaerobic populations of soil microflora. These bacteria, molds and fungi convert the material into an organic biomass as well as into inorganic components made available at the rates regulated by the action of the microflora themselves. The net result is nutrient availability in a form and rate that maximizes plant growth while simultaneously minimizing nutrient leaching and run off.

DESCRIPTION OF THE PREFERRED EMBODIMENT

I have found that a composition of dried freed amino acids, peptides, organic and inorganic nitrogen, as well as structural fiber and nonstructural carbohydrates as needed is useful as a soil adjuvant that stimulates soil bacterial growth. The soil adjuvant stabilizes soil nutrient dynamics with the specific objective of maximizing plant uptake of nutrients while preventing loss of nutrients through leaching and run off.

In the preferred embodiment of the invention, this composition is obtained from either glutamic acid fermentation solubles, corn fermentation solubles or a mixture thereof. Any other source material that provides the components of these fermentation solubles may be used. Some common sources are fermentation byproducts derived from a fermentation of fungal or bacterial origin. Examples include corn step liquor, corn distiller's solubles, and rye distiller's solubles. The origin of the base materials is not important. A carrier such as wheat middlings, etc., can be included if desired and in view of the drying method used. Any amount of carrier can be used. Typical ratios (wt/wt) of dried solubles to wheat middlings are from about 10:1 to about 1:10 including all values and subranges there between. Either of these solubles alone or individually, blended onto a carrier if necessary, are suitable. When the corn and glutamic acid fermentation solubles are mixed, they are mixed in any proportion, either before or after drying and each optionally on a carrier if mixed dry.

The one or more solubles is then dried to a maximum moisture content of about 30% at low temperature. Moisture contents of 0%, 8%, 14%, etc., are acceptable. Drying methods which may be used include vacuum drying, direct and indirect heat application, spray drying, evaporation, etc. A forced air grain processor, otherwise useful to roast soybeans, is preferred. Regardless of the method used, drying must be done at temperatures which will allow for modification of the solubility of the nitrogen fractions without denaturing them.

I have provided a blended source of organic and inorganic nitrogen of variable solubilities in the form of nonprotein nitrogen, peptides, amino acids and intact protein derived, in the preferred embodiment of the invention, from glutamic acid fermentation solubles and/or corn fermentation solubles to which a carrier and additional amino acids can be added, and which is superior to prior art compositions.

Glutamic acid fermentation solubles and corn fermentation solubles are the liquid effluents having greater than 30 wt. % water (moisture), typically 50–60% from the bacterial fermentation process used to produce monosodium glutamate and lysine hydrochloride, respectively. These processes are well known and common manufacturing processes, and the nomenclature by which these products are defined has been determined by the Association of American Feed Control Officials. Glutamic Acid Fermentation Solubles are comprised of a combination of water, nonprotein nitrogen, primarily in the form of ammonium chloride, peptides and free amino acids derived from the hydrolysis of the microorganisms used to produce the fermentation, glutamic acid and inorganic salts such as $MgSO_4$, NaCl, $KH_3PO_4$. Corn Fermentation Solubles are comprised of a combination of water, nonprotein nitrogen, primarily in the form of ammonium sulfate, peptides and free amino acids derived from the hydrolysis of the microorganisms used to produce the fermentation and inorganic salts such as $MgSO_4$, NaCl and $MnSO_4$.

Any amino acid may be added to the invention mixture described above.

The invention is useful as soil adjuvant for any agronomic or horticultural use.

The invention soil adjuvant may be applied to the soil at any time during the production cycle. The amount added will generally vary with the soil type and plant species to be fed.

Having generally described this invention, a further understanding can be obtained by reference to certain specific examples which are provided herein for purposes of illustration only and are not intended to be limiting.

EXAMPLES

Preparation of the Soil Adjuvant

In this example, the drying method used is forced air, although any process which allows for the removal of excess moisture while not damaging the biological value of the nitrogen components of the invention can be used, with the necessary modifications in materials preparation as dictated by the method used.

A mixture of Glutamic Acid Fermentation Solubles and Corn Fermentation Solubles at a ratio of 60/40 on a weight, weight basis is blended onto a wheat middlings carrier on a 1.67 to 1 weight, weight ratio of solubles to wheat middlings. These ratios can vary with the intended end product, or either of the components that make up the liquid blend can be used alone. The carrier may also be omitted if not desired or required by the drying process used. The material is then exposed to forced air at temperatures not less than about 80° F., but not more than about 900° F., with a preferred range being between about 190° F. and about 280° F. for a period of not less than about three minutes. This material is then cooled to about 900° F. and then about ⅓ of this material is recycled and reblended and again exposed to forced air temperatures not less than about 80° F., but not more than about 900° F. The material has a final moisture content of about 15% by weight based on total weight. This material can then be applied directly to the soil with use rate dictated by intended application.

Variations and modifications to the subject matter of this method may occur to those skilled in the art upon reviewing the invention as described herein. Such variations, if encompassed by this disclosure, are intended to be within the scope of this invention. The description of the preferred embodiment is set forth for illustrative purposes only.

What is claimed is:

1. A soil adjuvant comprising fermentation solubles dried to a total moisture content of less than thirty percent (30%) by weight; said fermentation solubles being chosen from the group consisting of glutamic acid fermentation solubles, dried corn fermentation solubles, fermentation bi-products derived from a fermentation of fungal or bacterial origin, and combinations thereof, said fermentation solubles further blended with a source of organic and inorganic nitrogen of variable solubility's in the form of non-protein nitrogen, peptides, amino acids and intact protein, wherein said dried fermentation solubles having been dried to a total moisture content of less than thirty percent (30%) by weight at a temperature not less than 80° F. and not more than 900° F., said soil adjuvant further comprising a carrier, said soil adjuvant comprising a mixture of fermentation solubles and a carrier in a ratio of about 1:10 to about 10:1 by weight, then the soil adjuvant is added to soil to enhance the organic and inorganic nitrogen content of the soil to maximize plant uptake of nutrients while preventing loss of nutrients through leaching and run-off.

2. The soil adjuvant of claim 1, wherein said carrier is wheat middlings.

3. The soil adjuvant of claim 1 further comprising glutamic acid.

4. The soil adjuvant of claim 1 wherein said dried fermentation solubles are dried glutamic acid fermentation solubles.

5. The soil adjuvant of claim 4 where said dried fermentation solubles are dried corn fermentation solubles.

6. The soil adjuvant of claim 1 where said dried fermentation solubles comprises a mixture of dried glutamic acid fermentation solubles and dried corn fermentation solubles.

* * * * *